Patented Aug. 5, 1941

2,251,554

UNITED STATES PATENT OFFICE 2,251,554

CONVERSION OF CARBON MONOXIDE WITH HYDROGEN INTO HYDROCARBONS

Franz Sabel, Hans Laudenklos, Wilhelm Wenzel, and Fritz Keilig, Leuna, Germany, assignors to Standard Catalytic Company, a corporation of Delaware No Drawing. Application April 29, 1939, Serial No. 270,920. In Germany May 7, 1938

5 Claims. (Cl. 260—449)

The present invention relates to the conversion of carbon monoxide with hydrogen for the purpose of producing hydrocarbons containing more than one carbon atom in the molecule.

In this conversion a decrease in the activity of the catalysts used usually occurs after a shorter or longer period of time which primarily is caused by the precipitation of substances of high molecular weight on the catalysts. It has already been proposed to reactivate the catalysts by removing these substances of high molecular weight by an extraction with solvents or by a treatment with hydrogen or steam at elevated temperatures. When working in this way the conversion has, however, to be discontinued, which owing to the necessity of carrying out the reactivation repeatedly, involves a considerable decrease in production.

We have now found that the said decrease in the activity of the catalysts can be avoided if the conversion of carbon monoxide with hydrogen into hydrocarbons with more than one carbon atom in the molecule is carried out by employing a gas mixture containing about two parts or less of hydrogen to one part of carbon monoxide (synthesis proper) and alternately, at intervals, a gas mixture richer in hydrogen containing at least 2.5 parts of hydrogen to one part of carbon monoxide, thereby reactivating the catalyst. Unless otherwise stated the parts herein referred to are by volume.

The said gas mixture richer in hydrogen alternately passed over the catalyst advantageously contains about 2.5 to 10 parts of hydrogen to one part of carbon monoxide. With such a mixture the catalyst is in continuous industrial operation repeatedly restored to about its original activity in a short time, whilst a considerable conversion into hydrocarbons of the desired kind takes place simultaneously, so that no very considerable decrease in production occurs during reactivation.

The synthesis proper may, for example, be carried out with a gas, which contains 30 per cent of carbon monoxide and 60 per cent of hydrogen and, when the activity of the catalyst has decreased below a certain degree, the catalyst may be reactivated with a gas containing 15 per cent of carbon monoxide and 75 per cent of hydrogen or with 12 per cent of carbon monoxide and 80 per cent of hydrogen (the remainder being inert gases).

The process in accordance with the present invention can be carried out with particular advantage by working in two or more reaction vessels and alternately introducing into each of them synthesis gas rich in carbon monoxide and a gas rich in hydrogen as hereinbefore defined, the catalyst being reactivated with the latter. When working in this way, the switching over may already be carried out, when the decrease in catalyst activity has not yet become definitely noticeable, and in this case the mixture richer in hydrogen need be passed through the reaction vessel only for a short time to restore the catalyst activity. Therefore the single working periods with the alternate gas mixtures may be taken within wide limits as convenient. This method of working makes an uninterrupted production and employment of the synthesis gas and of the said gas rich in hydrogen possible.

After long intervals of time one of the usual regeneration methods may also be applied.

The synthesis proper may be carried out under any suitable pressure, for example, ordinary or elevated pressure. Thus, pressures of 5, 20, 50, 100, 200 or more atmospheres may be employed. The temperatures are also the usual ones and are as a rule between 170° and 370° C. The reactivation is preferably carried out under the same conditions as to pressure and temperature. The process may be carried out in one or more stages and in the latter case the same or different conditions, for example, the same or different pressures or catalysts, may be employed in the individual stages.

The process may be carried out with any catalysts suitable therefor, for example, fused ferrosoferric oxide with suitable additions (particularly substances containing silicon and/or titanium) or sintered iron catalysts or mixtures of cobalt with activating substances, such as, for example, thorium oxide, suitably on carriers, such as, for example, kieselguhr, or catalysts containing nickel or mixtures of the said catalysts.

The process of the present invention allows of prolonging the lifetime of the catalysts to a multiple of that previously obtainable without a substantial decrease in the production of hydrocarbons occurring due to interruption of the desired synthesis.

Apart from this the process has the advantage that the gas mixtures containing about two parts or less of hydrogen to one part of carbon monoxide employed therein for the synthesis proper are initial materials which are particularly readily available, because the content of carbon monoxide in many gas mixtures produced industrially or industrially available is very considerable. To produce a synthesis gas of the desired composition in many cases a portion of this carbon monoxide must be converted with steam to hydrogen and carbon dioxide, the latter being then, if desired, removed. It is desirable, since thereby valuable carbon monoxide is converted to carbon dioxide, to keep the proportion of carbon monoxide to be converted with steam as low as possible.

The synthesis gases for the present process may be produced in any suitable manner, in particular by gasification of solid fuels, such as for example coke, bituminous coal, brown coal or of fuels of lesser value, or by conversion of natural or refinery gases with steam and carbon dioxide, or by an incomplete combustion of natural gases.

The said gas mixture richer in hydrogen may be produced in any suitable manner, for example, by one or more conversions of other gases carried out to give the desired composition, or by mixing two or more gases in the proportions which yield the desired composition, for example, by mixing a gas consisting completely or almost completely of hydrogen, for example electrolytically produced hydrogen, with carbon monoxide, which may also contain a certain amount of hydrogen, for example, synthesis gas. The production by mixing may take place by branching off a part of the synthesis gas shortly before that vessel in which the reactivation of the catalyst is just being carried out, and adding hydrogen in a proportion sufficient for the reactivation to the said branched off portion. The production by conversion of other gases may be carried out by a catalytic treatment of a part of the synthesis gas with steam, or by a cracking of the residual gases of the synthesis which contain hydrocarbons.

Finally the said gas rich in hydrogen may be obtained by a partial conversion with steam and a partial conversion into methane of a portion of the synthesis gas or by a separation by means of cooling to low temperatures, diffusion and the like of a fraction rich in hydrogen from the residual gas issuing from the synthesis.

The following example will further illustrate the nature of the said invention but it should be understood that the invention is not limited to the example.

*Example*

Over a cobalt catalyst containing 18 per cent of thorium oxide a gas is passed at 180° C. and under ordinary pressure, which contains carbon monoxide and hydrogen in the proportion of 1:2. After 28 days the activity of the catalyst has so far diminished that only about 50 cubic centimeters of liquid hydrocarbons per cubic meter of the carbon monoxide-hydrogen mixture are formed in contrast to a maximum production of 85 cubic centimeters. Hereupon the catalyst is treated for two days with a gas, which contains carbon monoxide and hydrogen in the proportion of 1:4, whereby a production of liquid products of about 70 per cent of that first obtained in the synthesis proper is obtained. After reverting to the gas first introduced the catalyst at once produces about 95 cubic centimeters of liquid hydrocarbons per cubic meter of the carbon monoxide-hydrogen mixture.

What we claim is:

1. In the production of hydrocarbons containing more than one carbon atom in the molecule by conversion of carbon monoxide with hydrogen in the presence of a catalyst promoting said conversion the step of reacting a gas mixture containing at the most about two parts of hydrogen to one part of carbon monoxide (synthesis proper) and alternately, at intervals, a gas mixture richer in hydrogen containing at least 2.5 parts of hydrogen to one part of carbon monoxide, thereby reactivating the catalyst.

2. A process as claimed in claim 1, in which the gas mixture richer in hydrogen contains from 2.5 to 10 parts of hydrogen to one part of carbon monoxide.

3. In the process as claimed in claim 1, reacting a gas mixture containing about 60 per cent of hydrogen and about 30 per cent of carbon monoxide and alternately, at intervals, a gas mixture containing from about 75 to 80 per cent of hydrogen and between about 15 and 12 per cent of carbon monoxide.

4. A process as claimed in claim 1 which comprises reacting simultaneously the two gas mixtures in separate reaction vessels and, at intervals, interchanging the said gas mixtures.

5. In the process as claimed in claim 1, reacting the gas mixture richer in hydrogen under the same conditions as to temperature and pressure as in the synthesis proper.

FRANZ SABEL.
HANS LAUDENKLOS.
WILHELM WENZEL.
FRITZ KEILIG.